Feb. 19, 1924.
O. A. KELLEY
1,483,890
END GATE FOR DUMPING WAGONS
Filed April 18, 1922
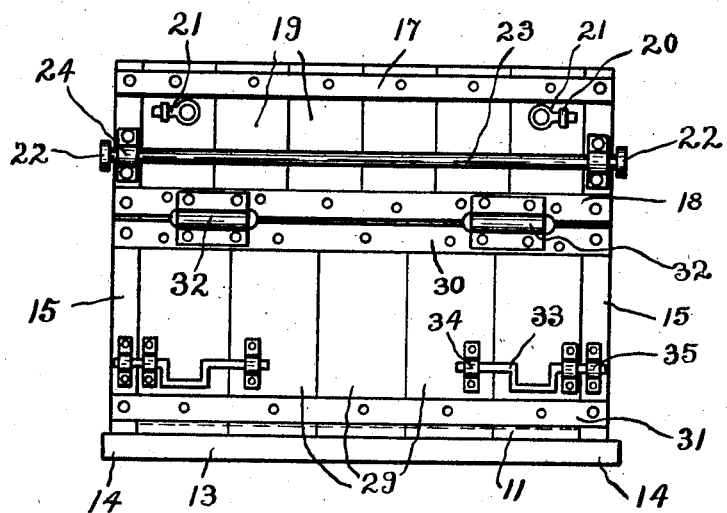
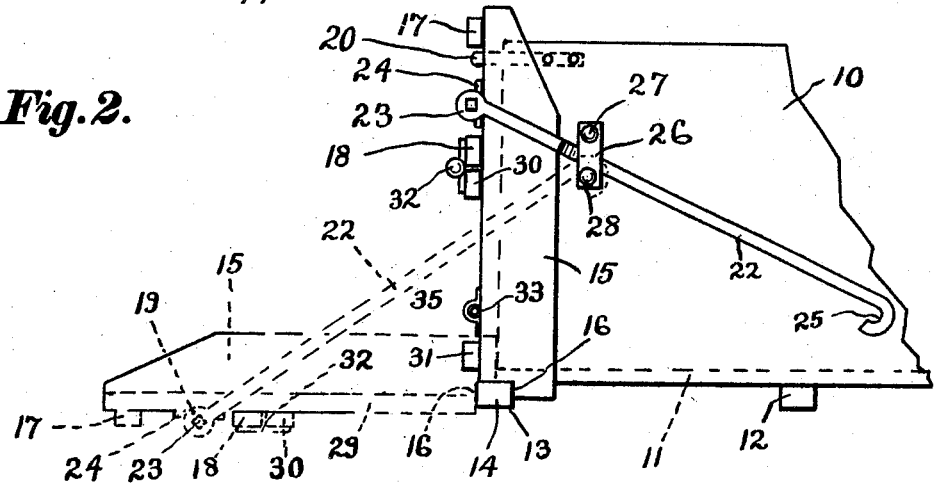
Inventor
OSCAR A. KELLEY.
By Arthur H. Sturges.
Attorney Patented Feb. 19, 1924.

1,483,890

UNITED STATES PATENT OFFICE.

OSCAR A. KELLEY, OF OMAHA, NEBRASKA.

END GATE FOR DUMPING WAGONS.

Application filed April 18, 1922. Serial No. 555,340.

*To all whom it may concern:*

Be it known that I, OSCAR A. KELLEY, a citizen of the United States, residing at Omaha, in the county of Douglas and State of Nebraska, have invented certain new and useful Improvements in End Gates for Dumping Wagons, of which the following is a specification.

The present invention relates to tail or end gates for dumping wagons and more particularly to that class wherein the wagon box is raised at its forward end or where the entire wagon is elevated on a platform.

An object of the present invention is to provide a tail gate for wagon boxes which may be held securely closed, which carries a door to permit the automatic dumping of the contents of wagon boxes and which may be swung down into the plane of the wagon boxes for facilitating shoveling or otherwise handling the material or articles which are adapted to be carried in the wagon box.

Another object of the invention is to provide a relatively strong and simply constructed end gate, the relatively adjustable parts of which may be securely locked in their closed positions so as to provide an uninterrupted closure at the open end of the wagon box and which provides a relatively smooth and uninterrupted platform when lowered.

A further object of the invention is to provide an end gate which is peculiarly constructed at its inner or lower end for interlocking engagement with the wagon box to support the end gate against outward thrust or downward movement, depending upon the adjustment of the end gate, and which thereby evenly distributes the strain imposed on the lower portion of the end gate by the elimination of hinges or other pivotal connections usually resorted to.

With the foregoing and other objects in view, the invention will be more fully described hereinafter, and will be more particularly pointed out in the claim appended hereto.

In the drawings, wherein like symbols refer to like or corresponding parts throughout the several views, Fig. 1 is a rear elevation of a tail gate in position on the rear end of a wagon box with the tail gate raised and with its parts in locked position;

Fig. 2 is a side elevation of the same, the wagon box being broken away, the dotted lines showing the end gate in lowered position for use as a platform; and, Fig. 3 is a view similar to Fig. 2 with the wagon box tilted into dumping position and showing the door of the gate released and open to permit the contents of the wagon box to dump or pour through the end gate.

Referring to the drawing, 10 designates the sides of a wagon box having the usual bottom 11 braced by transverse cleats 12 secured across the under side of the bottom and provided with a rear end cleat 13 secured across the under side of the bottom at the open end of the box and provided with projecting ends forming supports 14 for the end gate as will be hereinafter brought out.

The end gate comprises a frame including a pair of side bars 15 which are relatively broad and adapted to overlap the outer sides of a wagon box 10 and which at their lower ends extend beyond the upper surface of the cleat 13 and have forwardly and downwardly facing shoulders 16 adapted to seat upon the extensions or supports 14 of the rear cleat. The side bars 15 thus have depending projections which form interlocks with the supports 14 for holding the lower end of the frame from outward movement when the frame is in upright or in closed positions, as shown in the drawings, and for supporting the frame from downward movement when the frame is swung down into horizontal position, as shown in dotted lines in Fig. 2.

The side bars 15 carry upon their upper end portions a closed panel or frame part which comprises a pair of vertical spaced apart cleats 17 and 18 which are bolted or otherwise suitably secured at their ends across the rear edges of the side bars 15 and which carry a plurality of closely fitting slats or boards 19 for closing the upper end of the frame. The slats 19 abut in edgewise relation and extend between the side bars and terminate at their lower ends at the lower cleat 18.

The frame is secured in its upright position by fastening devices which are carried upon the inner sides of the wagon box 10, near the upper edge portions of the sides and which include rearwardly extending bolts 20 adapted to engage through registering openings in adjacent slats 19 when the frame is raised, the rear ends of the bolts 20 project beyond the rear faces of the slats and are suitably apertured for the reception of locking pins 21 which are adapted to be inserted in the openings of the bolts 20 and to lie against the rear side of the frame for holding the latter from swinging outwardly away from the wagon box. As shown in Fig. 1, these locking pins 21 may be in the form of eye-bolts to facilitate removal and positioning of the bolts and for the reception of any suitable connecting devices to prevent loss of the bolts when released.

The frame is adapted to be swung down into horizontal position with its shoulder 16 engaging the upper and rear edges of the support 13, as shown in Fig. 2, and when in such position, the outer end of the frame is supported upon a pair of suspension arms 22 which are affixed upon the opposite ends of a transverse shaft 23 pivotally supported in strap bearings 24 secured upon the rear side of the frame, such as upon the rear edge portions of the side bars 15. As the arms 22 are fixed upon the shaft 23, the arms are caused to move simultaneously and equally for effecting the uniform movement of the frame into raised and lowered positions and for supporting the opposite sides of the frame uniform. The inner ends of the arms 22 are hooked or shouldered as at 25 and the arms are slidably held against the outer sides of the wagon box 10 by strap guides 26.

These guides 26, as shown in Figs. 2 and 3, comprise straps of metal secured by upper and lower bolts 27 and 28 to the sides of the wagon box, and the lower bolts 28 are adapted to receive the shoulders or hooks 25 thereagainst for limiting the downward movement of the arms 22 and to support the frame when in horizontal position.

For the purpose of permitting the dumping or sliding of the contents of the wagon box 10, the lower open end of the frame is provided with a hinged door, and the latter comprises a plurality of slats 29 which are secured in edge to edge relation by a pair of transverse cleats 30 and 31. The slats 29, comprising the body portion of the door, freely fit in the frame opening and the cleats 30 and 31 project at opposite ends beyond the door body and are adapted to engage against the side bars 15 for limiting the inner swinging movement of the door. The cleat 30, which is the upper cleat, is connected to the lower cleat 18 of the frame by one or more hinges 32 upon which the door may swing outwardly as shown in Fig. 3.

The lower end of the door is provided with one or more latch bolts 33 which are slidably mounted in strap bearings 34 secured to the rear face of the door, and the bolts 33 are adapted to engage in keepers 35 which may be in the form of straps, as shown, secured to the rear edge of the side bars 15. When the bolts 33 are extended, as shown in Fig. 1, the door is locked in closed position and forms a continuation of the frame so as to completely close the latter and maintain the contents of the wagon box from displacement.

When it is desired to dump the contents of the wagon box by tilting the latter, the bolts 33 are retracted and the forward end of the wagon box is raised when the contents of the wagon box force the door into open position, as shown in Fig. 3, and the contents are then permitted to slide or flow through the opening in the lower end of the tail gate.

When it is desired to remove the contents of the box by shoveling or the like, the tail gate may be released from the bolts 20 and swung down into the position shown in Fig. 2. The tail gate then forms a platform which may be used in any conventional manner.

I do not wish to be restricted to the size, form, and proportions of the various parts, and obviously various changes could be made in the construction herein described without departing from the spirit of the invention, it being only necessary that such changes fall within the scope of the appended claim.

What is claimed is:

The combination with a wagon body, an end gate for said wagon body and comprising a frame adapted to swing up and down upon the rear end of the wagon body and being open at its lower end, a door mounted in the open lower end of the body, hinges at the outer edge of the door connecting the same to the upper closed portion of the end gate, sliding bolts mounted upon the lower portion of the door, keepers on the side portions of said frame adapted to receive the projecting ends of said bolts therein for locking the door in closed position in the frame to form a closed end gate, hinged rods mounted upon the end gate frame near the outer end thereof and arranged to extend in overlapping relation against the opposite sides of the wagon body, guide ways for said rods adapted to slidably receive the same and mounted on the outer sides of the wagon body, said rods having hooks on their ends adapted to engage in said guide ways when the end gate is lowered, and said rods are drawn through the guides, and independent means for locking the upper end of the frame to the wagon body for closing the rear end thereof.

In testimony whereof, I have affixed my signature in presence of two witnesses.

OSCAR A. KELLEY.

Witnesses:
ARTHUR H. STURGES,
HIRAM A. STURGES.